US007339892B1

(12) United States Patent
Engwer et al.

(10) Patent No.: US 7,339,892 B1
(45) Date of Patent: *Mar. 4, 2008

(54) SYSTEM AND METHOD FOR DYNAMIC CONTROL OF DATA PACKET FRAGMENTATION THRESHOLD IN A WIRELESS NETWORK

(75) Inventors: Darwin A. Engwer, Pleasanton, CA (US); Jonathan M. Zweig, Cupertino, CA (US)

(73) Assignee: Nortel Networks Limited, St. Laurent (CA)

( * ) Notice: Subject to any disclaimer, the term of this patent is extended or adjusted under 35 U.S.C. 154(b) by 352 days.

This patent is subject to a terminal disclaimer.

(21) Appl. No.: 09/751,332

(22) Filed: Dec. 28, 2000

Related U.S. Application Data

(60) Provisional application No. 60/226,494, filed on Aug. 18, 2000.

(51) Int. Cl.
*H04J 3/22* (2006.01)
*H04L 12/54* (2006.01)
(52) U.S. Cl. ........................ 370/235; 370/230; 370/466
(58) Field of Classification Search ........ 370/229–230, 370/235, 328, 332, 333, 348, 349, 465, 466, 370/445, 398, 365, 475; 455/509, 69, 67.11
See application file for complete search history.

(56) References Cited

U.S. PATENT DOCUMENTS

| | | | |
|---|---|---|---|
| 5,239,584 A | | 8/1993 | Hershey et al. ................ 380/28 |
| 5,440,545 A | * | 8/1995 | Buchholz et al. ........... 370/426 |
| 5,444,781 A | | 8/1995 | Lynn et al. .................... 380/46 |
| 5,454,026 A | | 9/1995 | Tanaka |
| 5,465,399 A | | 11/1995 | Oberholtzer et al. |

(Continued)

FOREIGN PATENT DOCUMENTS

EP 0 862 143 A2 9/1998

OTHER PUBLICATIONS

Chi-Chun Lo, et al. "QoS provisioning in handofff algorithms for wireless LAN", International Zurich Seminar on Broadband Communications. Accessing, Transmission, Networking, Feb. 17, 1998, pp. 9-16, XP002151137.

(Continued)

*Primary Examiner*—Chi Pham
*Assistant Examiner*—Ahmed Elallam
(74) *Attorney, Agent, or Firm*—Blakely Sokoloff Taylor and Zafman LLP

(57) ABSTRACT

In a wireless network system having a wired backbone network, one or more access points (APs), and one or more wireless units (WUs), a technique wherein an AP automatically determines a factor indicative of the error(s) occurring in the transmissions of one or more data packets to associated WUs, and automatically adjust the fragmentation threshold in accordance with the transmission error factor. The AP adjusts the fragmentation threshold in a manner that the data throughput is increased. Since the AP automatically and periodically gauges the wireless medium for RF interference that can cause data transmission errors, the fragmentation threshold can be dynamically adjusted to respond to changes in the wireless medium, such as when a microwave oven is turned on, and/or when a Blue Tooth device is traversing the wireless medium, etc. This is much more effective than having a system administrator periodically gauge the wireless medium for the purpose of selecting the appropriate fragmentation threshold.

24 Claims, 4 Drawing Sheets

U.S. PATENT DOCUMENTS

| | | |
|---|---|---|
| 5,481,535 A | 1/1996 | Hershey |
| 5,483,676 A | 1/1996 | Mahany et al. |
| 5,548,821 A | 8/1996 | Coveley |
| 5,570,343 A | 10/1996 | Bishop et al. |
| 5,621,894 A | 4/1997 | Menezes |
| 5,673,319 A | 9/1997 | Bellare et al. ............... 713/181 |
| 5,710,885 A | 1/1998 | Bondi |
| 5,715,164 A | 2/1998 | Liechti et al. ............... 705/410 |
| 5,724,346 A | 3/1998 | Kobayashi et al. ......... 370/329 |
| 5,745,699 A | 4/1998 | Lynn et al. .................. 395/200 |
| 5,754,947 A | 5/1998 | Tanabe et al. |
| 5,838,770 A | 11/1998 | Fukushima et al. |
| 5,844,905 A | 12/1998 | McKay et al. |
| 5,852,778 A | 12/1998 | Ladedz |
| 5,881,055 A | 3/1999 | Kondo |
| 5,881,104 A | 3/1999 | Akahane |
| 5,889,772 A * | 3/1999 | Fischer et al. ............... 370/346 |
| 5,901,362 A | 5/1999 | Cheung et al. .............. 455/525 |
| 5,953,426 A | 9/1999 | Windel et al. ................. 380/51 |
| 5,987,011 A | 11/1999 | Toh |
| 5,987,062 A | 11/1999 | Engwer et al. |
| 5,991,287 A | 11/1999 | Diepstraten et al. |
| 6,002,932 A | 12/1999 | Kingdon et al. ............. 455/433 |
| 6,031,528 A | 2/2000 | Langfahl, Jr. |
| 6,055,316 A | 4/2000 | Perman et al. |
| 6,058,106 A | 5/2000 | Cudak et al. ................ 370/313 |
| 6,064,678 A * | 5/2000 | Sindhushayana et al. ... 370/470 |
| 6,067,297 A | 5/2000 | Beach |
| 6,072,836 A | 6/2000 | Hardiman |
| 6,115,390 A | 9/2000 | Chuah |
| 6,115,610 A | 9/2000 | Goetz et al. |
| 6,154,461 A | 11/2000 | Stuniolo et al. ............. 370/401 |
| 6,163,810 A | 12/2000 | Bhagavath et al. |
| 6,173,411 B1 | 1/2001 | Hirst et al. |
| 6,175,856 B1 | 1/2001 | Riddle |
| 6,178,327 B1 | 1/2001 | Gomez |
| 6,182,043 B1 | 1/2001 | Boldl |
| 6,189,039 B1 | 2/2001 | Harvey et al. |
| 6,192,230 B1 | 2/2001 | van Bokhorst et al. |
| 6,215,876 B1 | 4/2001 | Gilley ......................... 380/260 |
| 6,256,334 B1 * | 7/2001 | Adachi ........................ 375/132 |
| 6,259,701 B1 | 7/2001 | Shur et al. |
| 6,304,760 B1 | 10/2001 | Bi et al. |
| 6,330,231 B1 | 12/2001 | Bi |
| 6,331,983 B1 | 12/2001 | Haggerty et al. |
| 6,370,381 B1 | 4/2002 | Minnick et al. ............. 455/445 |
| 6,392,990 B1 | 5/2002 | Tosey et al. |
| 6,404,756 B1 | 6/2002 | Whitehill et al. |
| 6,434,134 B1 | 8/2002 | La Porta et al. ............. 370/338 |
| 6,438,108 B1 | 8/2002 | Kanljung et al. |
| 6,438,365 B1 | 8/2002 | Balteanu |
| 6,456,597 B1 | 9/2002 | Bare |
| 6,456,860 B1 * | 9/2002 | Nakagaki .................... 455/561 |
| 6,463,295 B1 | 10/2002 | Yun |
| 6,465,399 B2 | 10/2002 | Koishikawa et al. |
| 6,469,991 B1 | 10/2002 | Chuah |
| 6,487,406 B1 | 11/2002 | Chang et al. ............... 455/426 |
| 6,522,888 B1 | 2/2003 | Garceran et al. |
| 6,535,493 B1 | 3/2003 | Lee et al. .................... 370/329 |
| 6,538,764 B2 | 3/2003 | Ueda |
| 6,553,015 B1 | 4/2003 | Sato ........................... 370/331 |
| 6,577,609 B2 | 6/2003 | Sharony ..................... 370/312 |
| 6,577,613 B1 | 6/2003 | Ramanathan |
| 6,580,700 B1 | 6/2003 | Pinard et al. ............... 370/332 |
| 6,614,937 B1 | 9/2003 | Hwang |
| 6,640,325 B1 | 10/2003 | Fischer |
| 6,643,469 B1 | 11/2003 | Gfeller et al. |
| 6,657,954 B1 * | 12/2003 | Bird et al. ................... 370/229 |
| 6,671,266 B1 | 12/2003 | Moon et al. |
| 6,687,247 B1 | 2/2004 | Wilford et al. |
| 6,690,659 B1 | 2/2004 | Ahmed et al. .............. 370/328 |
| 6,697,336 B1 | 2/2004 | Socher |
| 6,697,378 B1 * | 2/2004 | Patel .......................... 370/468 |
| 6,701,361 B1 | 3/2004 | Meier ......................... 709/224 |
| 6,714,514 B1 * | 3/2004 | Espax et al. ................ 370/230 |
| 6,721,302 B1 * | 4/2004 | Alastalo ..................... 370/346 |
| 6,745,013 B1 | 6/2004 | Porter |
| 6,795,407 B2 | 9/2004 | Chesson |
| 6,807,146 B1 | 10/2004 | McFarland |
| 6,842,605 B1 | 1/2005 | Lappetelainen et al. |
| 6,873,627 B1 | 3/2005 | Miller et al. |
| 6,891,855 B2 | 5/2005 | Bruckman |
| 6,947,483 B2 | 9/2005 | Engwer |
| 6,956,867 B1 * | 10/2005 | Suga .......................... 370/465 |
| 2001/0048744 A1 | 12/2001 | Kimura |
| 2002/0009199 A1 | 1/2002 | Ala-Laurila et al. ........ 380/247 |
| 2002/0037014 A1 | 3/2002 | Myojo |
| 2002/0045428 A1 | 4/2002 | Chesson |

OTHER PUBLICATIONS

"IEEE standard for information technology-telecommunications and information exchange between systems-local and metropolitan area networks-specific requirement. Part II: wireless LAN medium access control (MAC) and physical layer (PHY) specification. (ISO/IEC 8802-11, ANSI/IEEE Std 802.11-1999)" Aug. 20, 1999, pp. 38-54, XP002206839.

Khayata, R. Ellen, et al., "A Distributed Medium Access Protocol for Wireless LANs", *IEEE Transactions on Communications*, (1995),238-242.

Koutroubinas, Stelios , et al., "A New Efficient Access Protocol for Integrating Multimedia Services in the Home Environment", *IEEE Transactions on Consumer Electronics*, vol. 45, Issue 3, (Aug. 1999),481-487.

* cited by examiner

| DIVISIONAL FACTOR | DATA RATE M BY TESTS | TIME LINE |
|---|---|---|
| 1 | 11 | DATA 1500 BYTES 136 µS      ACK |
| 2 | 11 | DATA 750 BYTES 68 µS    ACK    DATA 750 BYTES 68 µS    ACK |
| 2 | 5.5 | DATA 750 BYTES 136 µS     ACK |
| 4 | 5.5 | DATA 375 BYTES 68 µS    ACK    DATA 375 BYTES 68 µS    ACK |

SYSTEM AND METHOD FOR DYNAMIC CONTROL OF DATA PACKET FRAGMENTATION THRESHOLD IN A WIRELESS NETWORK

This application claims benefit of U.S. Provisional Application No. 60/226,494 filed Aug. 18, 2000.

FIELD OF THE INVENTION

The present invention relates to the field of networking. In particular, the invention relates to a system and method in a wireless network system for dynamically controlling a data packet fragmentation threshold in response to changes in network environment conditions, including radio frequency (RF) interference and/or data rate changes. In addition, the invention relates to a system and method for sending a control signal to wireless units to enable request to send (RTS)/clear to send (CTS) and/or fragmentation modes of operations.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing remote wireless access, a wireless LAN (WLAN) is formed.

As described in U.S. Pat. No. 5,987,062 issued to Netwave Technologies, Inc., now owned by Nortel Networks Limited of Ontario, Canada, one type of WLAN employs dedicated stations, which are referred to as access points (APs). Therein, each AP is a relay station that includes a radio frequency (RF) transceiver that receives radio data packets from a mobile unit (MU) such as a notebook-type computer with a suitable adapter card as described in U.S. Pat. No. 5,987,062. Thereafter, the AP transmits the data packets to the fixed backbone network. Of course, the AP may receive data from the fixed backbone network and transmit it to one or more mobile units.

Before data transmission can occur between the fixed backbone network and an MU by way of an AP, the AP must first authenticate MU. The authentication is accomplished by the MU transmitting a request for authentication message to the AP, and the AP sending back a successful authentication message back to the MU. Once the MU has been authenticated, the MU has to associate itself with the AP. The association is accomplishes by the MU transmitting a request for association message to the AP, and the AP sending back in a successful association message. The authentication and association transmission are specified in the Institute of Electrical and Electronics Engineers (IEEE) 802.11 standard. Once the MU has been properly authenticated and associated with the AP, then data transmission between the MU and the fixed backbone network can occur.

A problem with current wireless networks deals with the situation where there is significant RF interference in the wireless communications link coupling an AP with the associated MU(s). Typical sources of significant RF interference for wireless network systems includes Blue Tooth devices, cellular telephones, microwave ovens, and other devices that transmit RF signals. When significant RF interference is present in the wireless medium of a wireless network system, generally more errors occur in the transmission of data between an AP and the associated MU(s).

The data error of the transmission is not only a function of the RF interference present in the wireless medium, but also of the size of the data packets. In an RF interference free environment, the wireless medium can support the transmission of data packets having relatively long data length without substantial transmission errors occurring. Thus, in an RF interference free environment, the optimal data throughput for the wireless medium occurs when the data packets are at maximum data size, which in a 802.11 compliant wireless network system is 2304 bytes. When RF interference increases in the wireless medium, more transmission data errors occur for the same data packet size. However, if the data packet size is reduced, the transmission data errors can be substantially reduced. Thus, in an RF interference environment, generally there is an optimal data packet size (less than the maximum data packet size) where the data throughput is maximum.

In prior art wireless network systems, a network system administrator occasionally gauges the RF interference present in a wireless network system in order to manually determine the optimal data packet size. This is accomplished by the system administrator causing an AP to send many tested patterns to a designated MU with varying data packet sizes, and then measuring the data throughput for each of the data packet sizes. Using this technique, the system administrator can determine the optimal data packet size.

Then, the system administrator manually sets the fragmentation threshold for each AP and MU of the wireless network system above the optimal data packet size. The fragmentation threshold sets the upper limit of the data portion of a packet. That is, if the payload size of a packet is greater than the fragmentation threshold, the data packet is fragmented so that each fragment transmitted has a payload that is less than the threshold. If the payload size of the packet is less than the fragmentation threshold, the packet is not fragmented, and simply transmitted.

The problem with this technique is that RF interference in a wireless environment is typically very dynamic, and therefore, a system administrator cannot practically determine and adjust for the optimal fragmentation threshold for every change in the wireless environment. For example, a person in a business office or a home can turn on the microwave oven for 30 seconds. During that 30-second period, the RF interference in the wireless medium increases. However, it would be impractical or even impossible for a system administrator to gauge the wireless environment for the purpose of determining the optimal fragmentation threshold each time a person turns on a microwave oven or some other RF interference source.

Another problem with current wireless network systems deals with fragmentation threshold as described above, and data transmission using request to send (RTS)/clear to send (CTS). In a 802.11 compliant wireless network system, the AP and the associated MUs are all able to use the wireless medium using carrier sense multiple access with collision avoidance, referred to as CSMA/CA. Using CSMA/CA, an MU first determines if the wireless medium is either idle or busy. If it is idle (i.e. the medium is available for transmission), the MU simply transmits the data packet to the AP, and the AP responds by sending an acknowledgement packet back to the AP if the data packet was successfully received. If the wireless medium is busy, the MU will backoff from sending the data packet for a random time period. After this period, the MU checks the wireless medium again to determine if it is idle or busy.

A problem with CSMA/CA may occur when MUs are within the range of an associated AP, but are outside of each others' ranges. In this case, when the first MU transmits a data packet to the associated AP, the second MU fails to hear that transmission. As a consequences, the second MU may falsely detect that the wireless medium is idle, and transmit its data to the AP, resulting in a collision of the data. The likelihood of this occurring increases when there is a relatively high count of MUs associated with an AP. A system administrator can correct or ameliorate this problem by employing request to send (RTS)/clear to send (CTS) transmissions throughput the wireless network system or at least throughout the sub-system comprising the AP and its associated MUs.

Using request to send (RTS)/clear to send (CTS) transmissions, an MU first sends a request to send (RTS) packet to he associated AP. If the following time slot is already reserved by another MU for transmission of a data packet, the AP simply does not send back a CTS packet. However, if the following time slot has not been reserved for transmission, the AP sends a clear to send (CTS) packet to the transmitting MU indicating that a following time slot is reserved for transmission by the transmitting MU. All other associated MU(s) detecting the CTS packet know that the following time slot is already reserved for transmission by the transmitting MU. Thus, this avoids the problem of MUs being outside the range of each other since the associated MUs will detect the CTS packet sent by the AP.

Typically, request to send (RTS)/clear to send (CTS) transmission are used when there is a relatively high number of MUs associated with an AP. So that request to send (RTS)/clear to send (CTS) transmissions is effective to avoid collisions, it should be enabled for all MUs and associated AP of an AP/MU cluster. However, as alluded to above, a problem with current wireless network systems is that the system administrator has to manually enable each AP and MU when RTS/CTS transmission is desired. Likewise, a system administrator has to enable each AP and MU when fragmentation is desired. Since there can be many APs and MUs in a wireless network system, having a system administrator go around to all of these units to enable RTS/CTS transmissions and/or fragmentation is cumbersome, costly and time-consuming.

Thus, there is a need for a system and method for dynamically controlling a data packet fragmentation threshold in response to changes in network environment conditions, including radio frequency (RF) interference and/or other parameters in a wireless network system. There is also a need for a system and method of globally controlling all MUs (referred to in this application as wireless units (WUs) since they need not be mobile) associated with an AP to enable RTS/CTS transmissions and/or data packet fragmentation. Such systems and methods are provided herein in accordance with the invention.

SUMMARY OF THE INVENTION

An aspect of the invention relates to a method of automatically adjusting a fragmentation threshold for data transmissions between an access point and one or more associated wireless units via a wireless medium associated with a wireless network system. The method comprises determining a transmission error factor indicative of errors occurring in the transmission of one or more data packets between the access point and the one or more associated wireless units, and automatically adjusting the fragmentation threshold based on the transmission error factor.

The transmission error factor can be determined by transmitting one or more data packets, and determining the transmission error factor based on the number of acknowledgement packets received in response to the transmitted one or more data packets. The transmission error factor can depend on the number of errors occurring in the transmission of the one or more data packets for a given time period. Also, the transmission data error can depend greater on transmission errors occurring successively (i.e. clusters of transmission errors) than on errors occurring sporadically.

The automatic adjusting of the fragmentation threshold can be accomplished by comparing the transmission error factor to an upper threshold and decreasing the fragmentation threshold if the transmission error factor is above the upper threshold. In the other direction, the fragmentation threshold is adjusted by comparing the transmission error factor to a lower threshold, and increasing the fragmentation threshold if the transmission error factor is below the lower threshold. The changes in the fragmentation threshold can be by a fixed quantity each time the fragmentation threshold is adjusted, or by a divisional factor, wherein the fragmentation threshold is equal to a pre-determined fragmentation threshold divided by the divisional factor. This pre-determined fragmentation threshold can be the maximum data packet size for transmission over the wired backbone network, or the maximum data packet size for transmission over the wireless medium.

The above method can be performed by an access point, a wireless unit, or other device in a wireless network system. The above method can also be embodied in a software routine stored on a machine readable medium.

Another aspect of the invention relates to a method of automatically adjusting a fragmentation threshold for data transmissions between an access point and one or more associated wireless units via a wireless medium associated with a wireless network system. The method comprises determining a transmission error factor indicative of errors occurring in the transmission of one or more data packets between the access point and the one or more associated wireless units; automatically adjusting the fragmentation threshold based on the transmission error factor, wherein the one or more data packets each have a finite time duration; changing a data rate of the transmissions of the one or more data packets; and automatically adjusting the fragmentation threshold in response to the data rate change so that the finite time during for the one or more data packets remains substantially the same.

This method can also be performed by an access point, a wireless unit, or other device in a wireless network system. And, the method can also be embodied in a software routine stored on a machine readable medium.

Yet another aspect of the invention relates to a wireless network system comprising a wired backbone network, an access point, and one or more associated wireless unit data coupled to the access point by way of a wireless transmission medium. In particular, this aspect of the invention is a method of enabling fragmentation of data packet above a fragmentation threshold in one or more wireless units, comprising transmitting a message to the one or more wireless unit having a first control data that causes the one or more wireless units to implement fragmentation threshold in transmitting data packets to the access point. The message is preferably a multicast data packet intended for the one or more associated wireless units. The message may further include a specified fragmentation to be used, and also another control signal for enabling request to send (RTS) and clear to send (CTS) transmission by the one or more wireless units.

Other aspects and features of the present invention will become apparent to those ordinarily skilled in the art upon review of the following description of specific embodiments of the invention in conjunction with the accompanying figures.

DETAILED DESCRIPTION OF THE INVENTION

Herein, the exemplary embodiments of the present invention relates to a wireless network that includes a field wired backbone network, one or more access point (AP) for providing wireless units access to the backbone network via a wireless communications link to the AP. The invention solves this problem by having an AP of a wireless network system automatically determine a factor indicative of the error(s) occurring in the transmissions of one or more data packets to the associated WU, and automatically adjust the fragmentation threshold in accordance with the transmission error factor. The AP adjusts the fragmentation threshold in a manner that the data throughput is increased. Since the AP automatically and periodically gauges the wireless medium for RF interference that can cause data transmission errors, the fragmentation threshold can be dynamically adjusted to respond to changes in the wireless medium, such as when a microwave oven is turned on, and/or when a Blue Tooth device is traversing the wireless medium, etc. This is much more effective than having a system administrator periodically gauge the wireless medium for the purpose of selecting the appropriate fragmentation threshold.

In the following description, certain terminology is used to describe features of the present invention. For example, "logic" includes hardware and/or software module(s) that perform a certain function on incoming information. A "software module" is executable code such as an operating system, an application or an applet for example. The term "information" is defined as data, address, and/or control. For transmission, the information may be placed in a frame featuring a single data packet or a series of data packets.

In addition, a "link" is broadly defined as one or more information-carrying mediums to establish a communications pathway. Examples of the medium include a physical medium (e.g., electrical wire, optical fiber, cable, bus traces, etc.) or a wireless medium (e.g., air in combination with wireless signaling technology).

Figure 1:
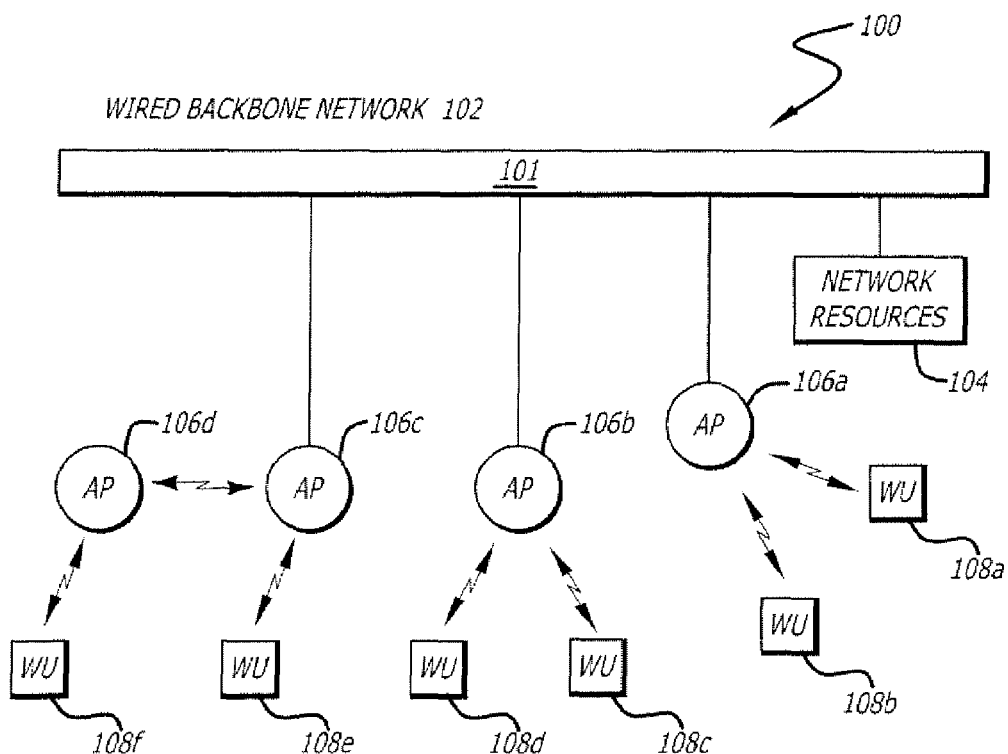
FIG. 1 illustrates a block diagram an exemplary wireless network system in accordance with the invention.

Referring to FIG. 1, an exemplary first embodiment of a wireless network system 100 in accordance with the invention is illustrated. The wireless network system 100 comprises a link 101 based on a physical medium. Herein, the link 101 is part of a wired backbone network 102 that includes network resources 104 available for users of the system 100. The wireless network system 100 further includes one or more access points (APs) 106a-106d that communicate via a wireless link with one or more wireless units (WUs) 108a-108f. For this embodiment, four (4) APs 106a-106d communicate with six (6) WU 108a-108f.

Users using the WUs 108a-108f can access the network resources 104 via any of the APs 106a-106d, which are generally transparent bridges that link a wireless network defined by one or more WUs 108a-108f with the wired backbone network 102. The WUs 108a-108f communicate with the APs 106a-106d typically using a standardized protocol, such as the IEEE 802.11 protocol.

A "wireless unit" (WU) is defined herein as any electronic device comprising processing logic (e.g., a processor, microcontroller, state machine, etc.) and a wireless transceiver for receiving and transmitting data to an access point (AP) or another wireless unit (WU). Examples of a WU include a computer (e.g., desktop computer, laptop computer, handheld computer such as a personal digital assistant "PDA", etc.), communications equipment (e.g., pagers, telephones, facsimile machine, etc.), a television set-top box, or appliances such as refrigerator models, electronic picture frames, alarm detectors, water detractors, etc. The WU includes hardware and/or software to receive a notification from an assigned AP of a failed communications link between the associated AP and the wired backbone network 102. In addition, the WU also includes hardware and/or software to initiate a search for a new AP to associate with upon receiving such a notification of a failed communications link to the wired backbone network 102 from its associated AP.

An "access point" (AP) is a device that provides a bi-directional connection between one or more WUs and the wired backbone network 102. However, an AP could also have a wireless connection back to the backbone network 102, such as AP 106d, which has a wireless link to the backbone network 102 via another AP 106c. The wired backbone network can be of any type, including an Ethernet, a token ring, and an asynchronous transfer mode (ATM) network. The AP of the invention includes hardware and/or software to detect a failed communications link to the wired backbone network. The AP of the invention also includes hardware and/or software to notify associated WUs of the failed communication link so that the WUs take appropriate action to reestablish their line to the backbone network 102 by way of another AP.

Figure 2:
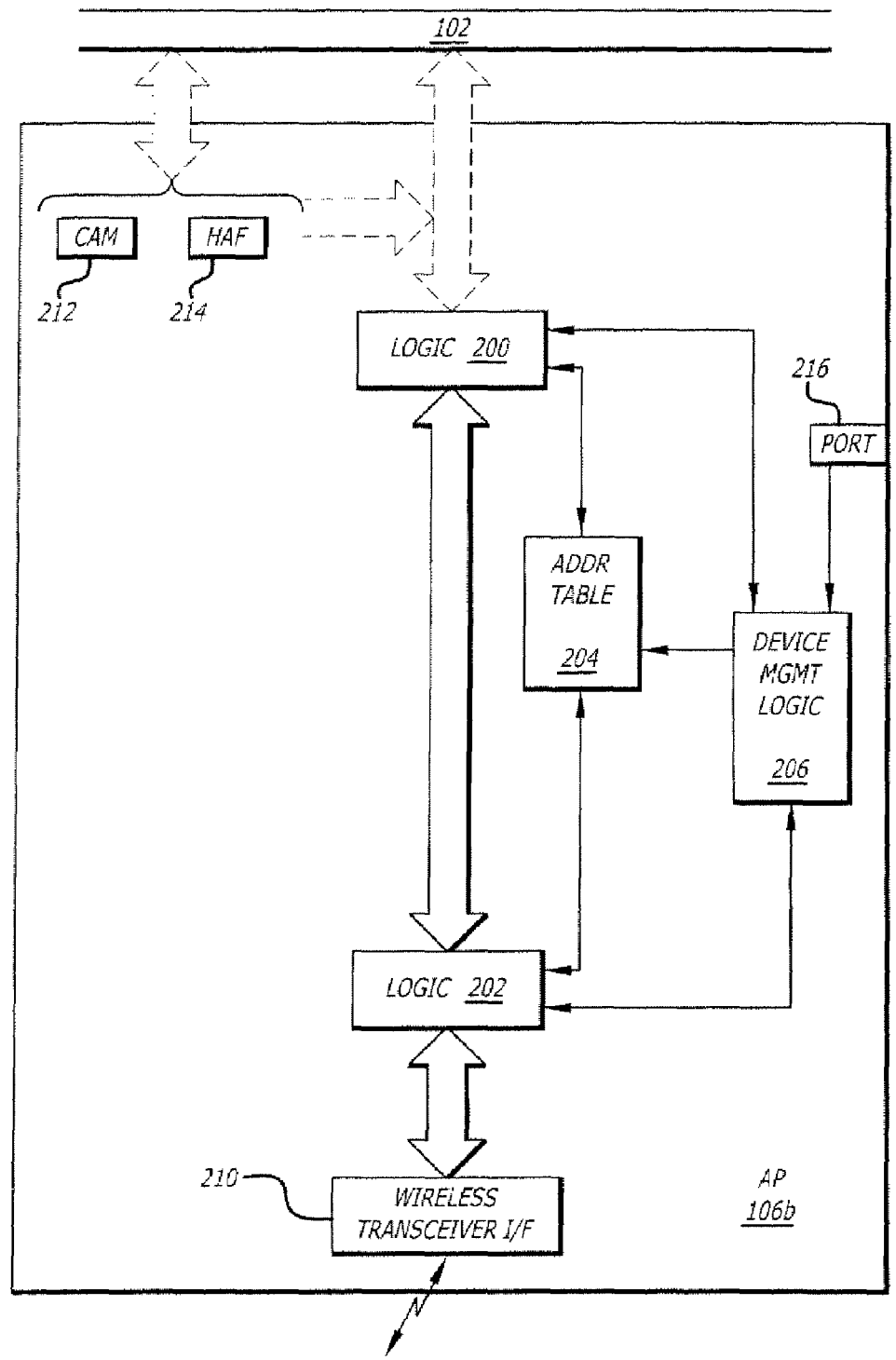
FIG. 2 illustrates a block diagram of an exemplary access point (AP) in accordance with the invention.

Referring now to FIG. 2, an exemplary embodiment of an access point (A) is shown. For illustrative purposes, the access point is represented by AP 106b and differs in function from the access points described in U.S. Pat. No. 5,987,062. As shown, AP 106b comprises logic 200 and 202, an address table 204, a device management module 206, and a wireless transceiver interface 210. In particular, the logic 200 is used to determine whether certain information from the wired backbone network 102 is destined for one or more of the WUs. The address table 204 includes media access controller (MAC) addresses for all of the wireless units associated with the AP 106b such as WUs 108c-d of FIG. 1. In the special case of all broadcast or some multicast packets, the packets are addressed to all or some of the wireless units (WUs) associated with the access point (AP) on a "best efforts" basis.

Similarly, as information from wireless units (WU) is received by the wireless transceiver 210, the logic 202 monitors addresses within this information against the contents of the address table 204. One reason is that only information from authenticated and associated wireless units (e.g., WUs 108c-d) is accepted. Hence, if a non-authenticated wireless unit transmits packets, these packets will not be forwarded to the wired backbone network 102 of FIG. 1. The logic 202 subsequently transmits the information to the logic 200 for routing to the wired backbone network 102.

In the event that the fixed backbone network 102 of FIG. 1 has a substantially larger data rate than the wireless network, content addressable memory (CAM) 212 and a hardware address filter (HAF) 214 are employed within the AP 106b. The CAM 212 and HAF 214 are in communication with the fixed backbone network 102 and collectively filter information at the hardware level so that the logic 200 processes only a small portion of the information routed over the wired backbone network 102.

The device management module 1206 provides a mechanism for adjusting the various parameters and controlling the functionality of the AP 106b. An example of one mechanism involves placement of a serial port 216 within the AP 106b. The serial port 216 provides a direct connection to the AP 106b. Other mechanisms include (1) Simple Network Management Protocol (SNMP) management tools such as OPTIVITY® by Nortel Networks Limited of Montreal, Canada, (2) TELNET, or (3) web-based management software.

Referring back to FIG. 1, in a typical scenario, a WU associates itself with one of the APs to communicate with the wired backbone network 102. For instance, in the example shown in FIG. 1, WUS 108a-b are associated with AP 106a, WUs 108c-d are associated with AP 106b, WU 108e is associated with AP 106c, and WU 108f is associated with wireless AP 106d. Which access point (AP) a wireless unit (WU) is associated with can depend on many factors, including signal quality, load balancing, restricted links and other factors. The APs associated with a particular WU can change, such as when the WU "roams" from the coverage area of a particular AP to a coverage area of another AP. From the standpoint of the user using the WU, this change in associated AP is transparent.

Figure 3:
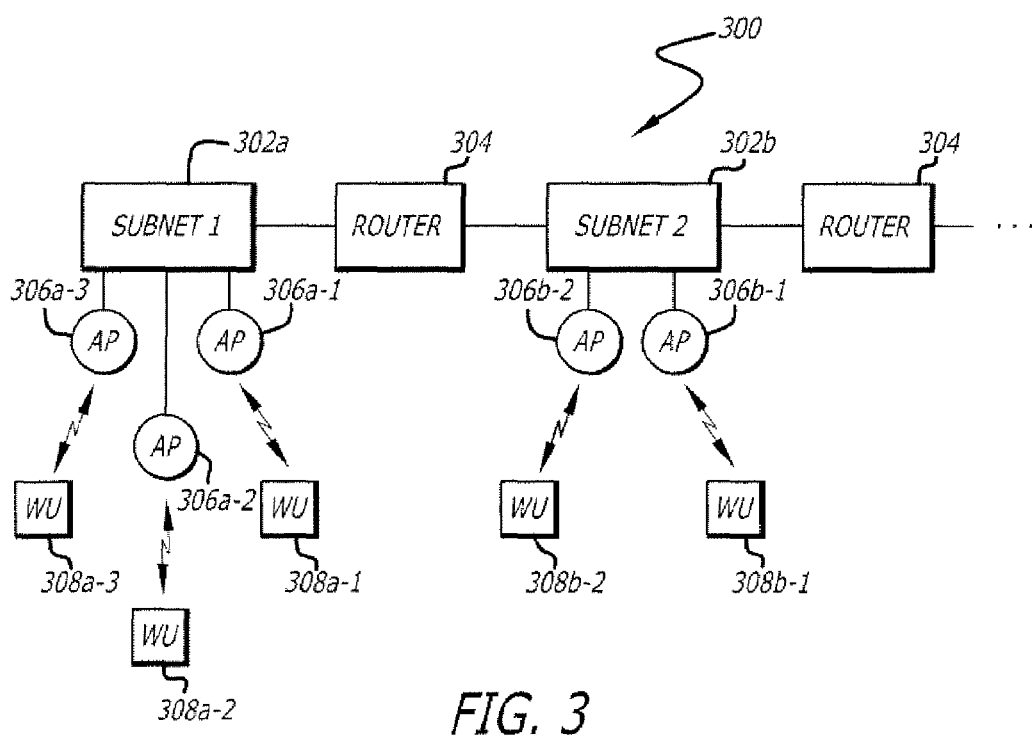
FIG. 3 illustrates a block diagram of another wireless network system in accordance with the invention.

FIG. 3 illustrates an exemplary second embodiment of a wireless network system 300 in accordance with the invention. The wireless network system 300 comprises two or more sub-networks 302a-b, which communicate with each other by way of a router 304. The sub-networks 302a-b can be any wired backbone network, including Ethernet, token ring, and an asynchronous transfer mode (ATM) network. The sub-networks 302a-302b need not be of the same type, for instance, sub-network 302a can be an Ethernet, and sub-network 302b can be a token ring. Each sub-network 302a-b has one or more APs for communicating with associated WUs. For instance, sub-networked 302a includes APs 306a-1, 306a-2, 306a-3 for communicating respectively with WUs 308a-1, 308a-2, and 308a-3. Sub-network 302b includes APs 306b-1 and 306b-2 for communicating respectively with WUs 308b-1 and 308b-2. In this system, a WU associated with an AP on a particular sub-network (e.g. sub-network 302a) can also change its association to an AP on another sub-network (e.g. sub-network 302b) by roaming as discussed above or other circumstances.

As previously discussed, a problem with the current wireless network deals is that RF interference in a wireless environment is typically very dynamic, and therefore, a system administrator cannot practically determine and adjust the fragmentation threshold for every change in the wireless environment. For example, a person in an office or a home can turn on the microwave oven for 30 seconds. During that period, the RF interference in the wireless medium increases. However, it would be impractical or even impossible for a system administrator to gauge the wireless environment for the purposes of determining the optimal fragmentation threshold each time a person turns on a microwave oven or some other RF interference source.

The invention solves this problem by having an AP of a wireless network system automatically determine a factor indicative of the error(s) occurring in the transmissions of one or more data packets to the associated WU, and automatically adjust the fragmentation threshold in accordance with the transmission error factor. The AP adjusts the fragmentation threshold in a manner that the data throughput is increased. Since the AP automatically and periodically gauges the wireless medium for RF interference that can cause data transmission errors, the fragmentation threshold can be dynamically adjusted to respond to changes in the wireless medium, such as when a microwave oven is turned on, and/or when a Blue Tooth device is traversing the wireless medium, etc. This is much more effective than having a system administrator periodically gauge the wireless medium for the purpose of selecting the appropriate fragmentation threshold.

Figure 4:
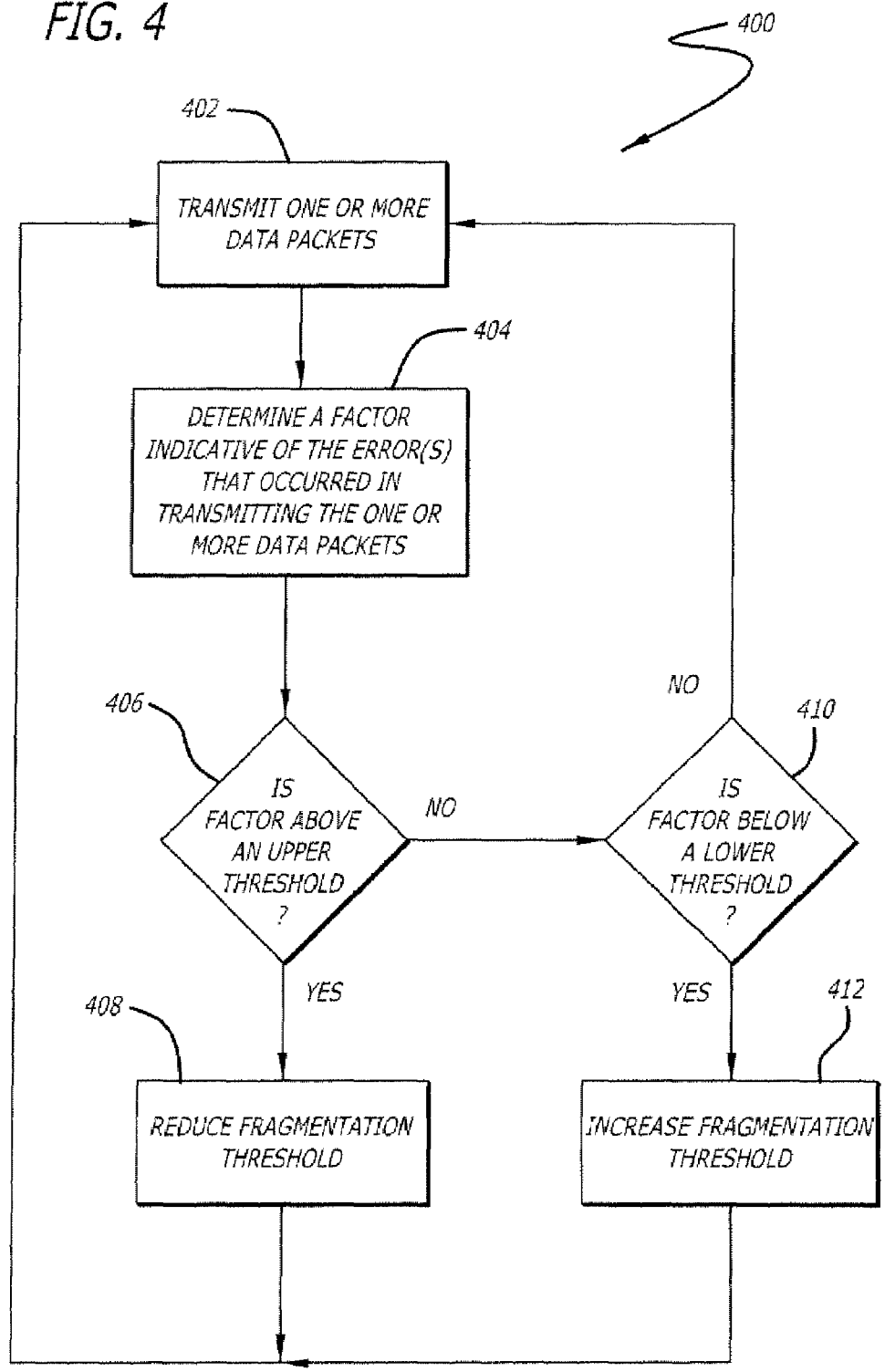
FIG. 4 illustrates a flow chart of an exemplary routine that an AP can perform to automatically adjust the fragmentation threshold.

FIG. 4 illustrates a flow chart of an exemplary routine 400 that an AP can perform in automatically adjusting the fragmentation threshold to increase data throughput in the presence of significant RF interference. In step 402, the AP first transmits one or more data packets to one or more associated WU(s) in the normal course of sending data to the WU(s). In step 404, the AP determines a factor indicative of the error(s) that occurred in the transmission of the one or more data packets to the WU(s). Since the 802.11 wireless network system uses a positive acknowledgment protocol (i.e. the transmission of an acknowledge packet when a data packet is successfully received) for data that is transmitted via the wireless medium, the AP can determine the transmission error factor by the amount of acknowledgement packet(s) received in response to its transmissions of the one or more data packet(s).

In step 406, the AP compares the transmission error factor to a pre-determined upper threshold. The pre-determined upper threshold is a maximum transmission error factor that could be tolerated without having to decrease the fragmentation threshold. If the transmission error factor increases above the upper threshold as determined in step 406, this indicates that significant data transmission errors are occurring in the wireless medium requiring a decrease in the fragmentation threshold. Accordingly, in step 408 the fragmentation threshold is reduced, and the AP subsequently transmits one or more data packet(s) to the associated WU(s) using the new fragmentation threshold. If the transmission error factor is below the upper threshold as determined in step 406, this indicates that significant data transmission errors are not occurring in the wireless medium, and the routine proceeds to step 410.

In step 410, the AP compares the transmission error factor to a pre-determined lower threshold. The pre-determined lower threshold is a minimum transmission error factor for which an increase in the fragmentation threshold is not necessitated. If the transmission error factor falls below the lower threshold as determined in step 410, this indicates that fragmentation threshold can be increased in order to increase the data throughput through the wireless medium. Accordingly, in step 412 the fragmentation threshold is increased, and the AP subsequently transmits one or more data packet(s) to the associated WU(s) using the new fragmentation threshold. If the transmission error factor is above the lower threshold as determined in step 410, this indicates that there are some data transmission errors, not significant as to require a decrease in the fragmentation threshold, but significant enough not to increase it either. Thus, the current fragmentation threshold is maintained, and the AP subsequently transmits one or more data packet(s) to the associated WU(s) using the current fragmentation threshold.

With regard to step 404, there are many algorithms that an AP can use to determine the transmission error factor for the purpose of adjusting the fragmentation threshold. For instance, the transmission error factor can be a percentage of data transmission errors that occurred within a given time period. This method, however, may not be desirable because data transmission errors can be common in a system. A more effective method of determining a transmission error factor is to weigh transmission errors that occur successively (i.e. clusters of transmission errors) greater than those errors that occur sporadically. If transmission errors occur successively, this indicates that there may be a problem, such as a temporary increase in RF interference, in the wireless medium. Other methods of determining a transmission error factor can be based on an empirical modeling of the wireless channel. There are many other methods of determining a transmission error factor for the purpose of adjusting the fragmentation threshold.

With regard to steps 408 and 412 of reducing and increasing the fragmentation threshold, this can be accomplished in many ways. For instance, once it has been determined that the fragmentation threshold has to be reduced or increased in step 406 or 410, the AP can decrement or increment the fragmentation threshold by one or some other fixed quantity. Using this method, an repeating the routine 400 depicted in FIG. 4, a fragmentation threshold that provides optimal data throughput for the system can be achieved.

Another method of adjusting the fragmentation threshold is to use a divisional factor where the current fragmentation threshold is given by a maximum fragmentation threshold divided by the divisional factor. The maximum fragmentation threshold is preferably set at or above the maximum packet size specified by the wired backbone network protocol. If an Ethernet type network is used, the maximum data packet size is 1518 bytes. Thus, the maximum fragmentation threshold is set to 1581 bytes. If there is minimal RF interference in the wireless medium, the divisional factor is set to 1, thereby making the fragmentation threshold 1518 and consequently no fragmentation of data packets occur. When Rf interference initially occurs that causes the transmission error factor to increase above the upper threshold (See FIG. 4), the divisional factor is increased to 2, thereby reduction the fragmentation threshold to 759. If the transmission error factor is still above the upper threshold, the divisional factor is increased again to 3, thereby reducing the fragmentation threshold to 506, and so on. Similarly, the divisional factor is decreased when the transmission error factor falls below the lower threshold (See FIG. 4).

The advantage of using fixed steps to adjust the fragmentation threshold is that generally a fragmentation threshold is arrived that produces a more optimum data throughput. However, because the changes in the fragmentation threshold are by fixed steps, it takes a relatively long time to arrive at the optimum fragmentation threshold. The advantage of using the divisional factor to adjust the fragmentation threshold is that the change in the threshold is quick at the beginning to attack the problem faster, but changes slowly as the problem increases. This adjustment of the fragmentation threshold parallels how environment changes occur in networks. The only drawback with this method is that the optimal fragmentation threshold may lie at a value not capable of being reached because of the discrete step of the divisional factor. In any event, the above two methods of adjusting the fragmentation threshold are merely examples. There are many other ways to adjust the fragmentation threshold in response to changes in the wireless medium environment.

Another consideration is the time length of a data packet when data rates are changed and fragmentation of data is being performed to increase data throughput in the presence of significant RF interference. The time duration of data packet is given by the size of the packet divided by the data rate. Fragmenting a data packet (i.e. reducing the size of a data packet), therefore, makes its duration shorter. If a data packet has a relatively long duration, it is more prone to be adversely affected by RF interference. This is the reason why the data size of data packets are made smaller by fragmentation to reduce duration of the packets so that they are less vulnerable to RF interference. However, as previously stated, the duration of a data packet is not only a function of data size, but also of the data rate. So changes in the date rate should be taken into account when fragmentation is employed in order to maintain the desired duration for the packet.

Figures 5, 6:
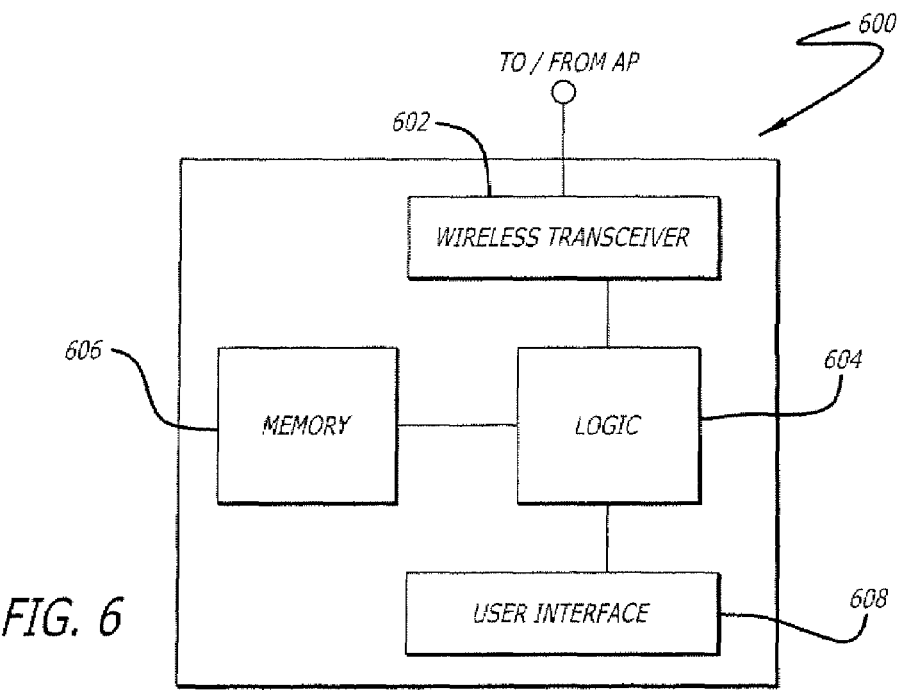
FIG. 5 illustrates a table useful for explaining the relationship between the fragmentation threshold and the data rate.
FIG. 6 illustrates a block diagram of an exemplary wireless unit (WU) for performing the various functions in accordance with the invention.

FIG. 5 illustrates a table useful for explaining the relationship between the fragmentation threshold and the data rates. The left-most column lists divisional factor for four exemplary scenarios, with the maximum fragmentation threshold being 1500 for all the scenarios. The second column lists the data rates for the four exemplary scenarios. And, the right-most column is a time line of the data packet payloads and corresponding acknowledgement packets for the four exemplary scenarios.

In the first scenario, the divisional facto is 1, thereby making the fragmentation threshold 1500 bytes (i.e. the maximum fragmentation threshold of 1500 divided by the divisional factor of 1). The data rate for the first scenario is 11 Megabytes per second (Mbytes/s). Assuming the size of the payload of the data packet is the same as the fragmentation threshold, then the duration of the payload is 136 microseconds.

In the second scenario, significant RF interference is present in the wireless medium which causes the AP to reduce the fragmentation threshold by increasing the divisional factor from one to two. Thus, the fragmentation threshold is 750 bytes (i.e. the maximum fragmentation threshold of 1500 divided by the divisional factor of 2). The data rate for this scenario is maintained at 11 Mbytes/s. Assuming the size of the payload of the data packet is the same as the fragmentation threshold, then the duration of the payload has been shortened to 68 microseconds. This illustrates that the original data payload having a duration of 136 microseconds was too long that is was prone to adverse effects from the RF interference. By shortening the duration of the payload to 68 microseconds with fragmentation, the data packet is less prone to the RF interference.

In the third scenario, the data rate has been reduced to 5.5 Mbytes/s. This may be done by a system administrator for any number of reasons. In this scenario, the divisional factor of 2 is maintained the same, thereby the fragmentation threshold is again 750 bytes. Assuming the size of the payload of the data packet is the same as the fragmentation threshold, then the duration of the payload returns back to 136 microseconds due to the data rate change. However, it has already been determined that a duration of 136 microseconds for the payload makes the data packet prone to adverse effects from the RF interference. To correct this, the fragmentation threshold has to be reduced by half again to maintain the duration of the payload at 68 microseconds, where the data packet is less prone to adverse effects from RF interference.

Thus, in the fourth scenario, the divisional factor has been increased to 4, thereby making the fragmentation threshold 375 bytes (i.e. the maximum fragmentation threshold of 1500 divided by the divisional factor of 4). Again, the fragmentation threshold has been decreased to compensate for the decrease in the data rate from 11 to 5 Mbytes/s. Thus, the duration of the data payload is 68 microseconds, where the data packet is less prone to adverse effects from RF interference. This example illustrates the concept that if fragmentation is being used and there is a data rate change, the fragmentation threshold has to similarly change in order to maintain substantiality the same duration for the data packet.

As previously discussed, in order for fragmentation and/or RTS/CTS transmission to optimally work in a wireless network system, the AP as well as its associated WU(s) should all use fragmentation and/or RTS/CTS transmission. However, in current wireless network system, a system administrator has to manually enable each AP and associated WU(s) when fragmentation is desired. Likewise, a system administrator has to enable each AP and associated WU(s) when RTS/CTS transmission is desired. Since there can be many APs and WUs in a wireless network system, having a system administrator go around to all of these units to enable fragmentation and/or RTS/CTS is cumbersome, costly and time-consuming.

The invention solves this problem by having an AP transmit a multicast packet including a control signal that enables fragmentation and/or RTS/CTS transmissions in the associated WU(s). The multicast packet also includes the fragmentation threshold to be used. Thus, instead of a system administrator having to manually enable the AP and each of the associated WU(s) for fragmentation and/or RTS/CTS transmissions, with the use of the multicast packet, the AP automatically enables these functions for all the associated WU(s). This is a substantial saving in time and money, and is substantially less cumbersome.

In the preferred embodiment, the multicast data packet sent out by the APs conform to an Inter Access Point Protocol (IAPP) developed by Netwave Technologies, Inc., now owned by Nortel Networks Limited. The IAPP protocol is used for automated hop sequence between APs, handover notification when a WU roams from one AP to another AP, and for delivery of various AP information, such as the AP network protocol address and subnet mask as previously discussed. The IAPP uses an IEEE 802.3 frame format with the sub-network access protocol (SNAP). The IAPP broadcast packet includes a header defining various parameters such as destination address which is typically set to a multicast address, a source address set to the network protocol address of the transmitting AP, length of the packet, and other information, and a payload which includes informational elements such as the AP name, the number of associated WU(s) (i.e. the head count), a control signal for enabling fragmentation in the associated WU(s), the fragmentation threshold to be used, a control signal for enabling RTS/CTS transmissions in the associated WU(s), and other information.

Referring back to FIG. 2, the AP 106b of the invention includes a logic circuit, such as the device management module 206, for generating and transmitting to the associated WU(s), a multicast packet (e.g. the IAPP multicast packet described above) that includes a control signal for causing the associated WU(s) to fragment data packets if the payload is above a fragmentation threshold. The multicast packet also contains an information element of the desired fragmentation threshold. Along this line, the AP 106b of the invention includes a logic circuit, such as the device management module 206b, for determining when to employ fragmentation and at what fragmentation threshold based on a factor indicative of the data rate changes. Such a logic circuit can also determine the data transmission error factor based on many different algorithms such as the ones discussed above or others.

The AP106 of the invention also includes a logic circuit, such as the device management module 206, for generating and transmitting to the associated WU(s), a multicast packet (e.g. the IAPP multicast packet described above) that includes a control signal for causing the associate WU(s) to perform RTS/CTS transmissions. In addition, the logic circuit of AP 106b can also automatically determine when to employ RTS/CTS transmissions for itself and the associated WU(s) based upon such factors as the number of associated WUs (i.e. the head count), and/or the number of retry transmission counts, and/or the number of collisions.

FIG. 6 illustrates a block diagram of an exemplary wireless unit (WU) 600 for performing the various functions in accordance with the invention. As previously discussed, examples of a WU 600 includes a computer (e.g., desktop computer, laptop computer, hand-held computer such as a personal digital assistant "PDA", etc.), communications equipment (e.g., pagers, telephones, facsimile machine, etc.), a television set-top box, or appliances such as refrigerator pads, electronic picture frames, alarm detectors, water detectors, etc. The WU 600 comprises a wireless transceiver 602 for transmitting and receiving RF data packets to and from an AP, a logic circuit 604 for performing the various functions of the WU 600, a memory 606 for storing data and applications relating to the various functions of the WU 600, and a user interface 608 for receiving and presenting information from and to a user of the WU 600. Such user interface 608 can include a keyboard, pointing device (e.g. a mouse, a track ball, etc.), a microphone, display, speakers and other devices for conveying and receiving information to and from a user.

With regard to the invention, the logic circuit 604 of the WU 600 receives by way of the wireless transceiver 602 the multicast packet (e.g. the IAPP multicast packet described above) transmitted by the associated AP that includes the control signal for causing the WU 600 to fragment data packets if the payload is greater than a fragmentation threshold. The specified fragmentation threshold is also included in the multicast packet. The logic circuit 604 stores the specified fragmentation threshold in memory 606 and sets a flag for performing fragmentation. The logic circuit 604 will thereafter fragment each data packet whose payload is greater than the fragmentation threshold, and transmits the two or more fragments as individual packets to the associated AP by way of the wireless transceiver 602. If the payload of the data packet is less than the fragmentation threshold, the logic circuit 604 simply transmits the whole packet to the associated AP by way of the wireless transceiver 602.

Alternatively, the WU 600 an also determine on its own, without instructions from the associated AP, whether to perform fragmentation of data packets based on data transmission errors, data rate changes, and/or other factors. Specifically, the logic circuit 604 can make such a determination using the same one or more routines performed by an AP, as described with reference to FIGS. 4 and 5. If the logic circuit 604 determines that fragmentation is needed, it can determine the fragmentation threshold using the same one or more routines performed by an AP, as described with reference to FIGS. 4 and 5.

Also with regard to the invention, the logic circuit 604 of the WU 600 receives by way of the wireless transceiver 602 the multicast packet (e.g. the IAPP multicast packet described above) transmitted by the associated AP that includes the control signal for causing the WU 600 to perform RTS/CTS transmissions. In response to this control signal, the logic circuit 604 sets a flag that enables RTS/CTS transmissions. The logic circuit 604 will thereafter transmit an RTS packet prior to sending a data packet to the associated AP by way of the wireless transceiver 602, and wait a pre-determined time interval to receive a CTS packet from the associated AP. If the logic circuit 604 receives the CTS packet from the associated AP within the pre-determined time interval, then the logic circuit 604 transmits the corresponding data packet during the reserved time slot following the receipt of the CTS packet. If the logic circuit 604 does not receive the CTS packet within the pre-determined time interval, the logic circuit 604 retransmits another RTS packet and repeats the same process again.

Alternatively, the WU 600 can also determine on its own, without instructions from the associated AP, whether to perform RTS/CTS transmissions based on the amount of associated WUs, number of retry transmissions, number of collisions, and/or how proximate other associated WUs are by monitoring their signal strength on data. Specifically, the logic circuit 604 can make such a determination using the same one or more routines performed by an AP, as described with reference to FIGS. 4 and 5.

In the foregoing specification, the invention has been described with reference to specific embodiments thereof. It will, however, be evident that various modifications and changes may be made thereto departing from the broader spirit and scope of the invention. The specification and drawings are, accordingly, to be regarded in an illustrative rather than a restrictive sense.

The invention claimed is:

1. A method of automatically adjusting a fragmentation threshold for data transmissions between an access point and one or more associated wireless units, comprising:
   determining a transmission error factor indicative of errors occurring in a transmission of one or more data packets between the access point and the one or more associated wireless units; and
   automatically adjusting the fragmentation threshold based on the transmission error factor by changing the fragmentation threshold by a divisional factor each time the fragmentation threshold is adjusted, the fragmentation threshold being based on a pre-determined fragmentation threshold divided by the divisional factor.

2. The method of claim 1, wherein the determining of the transmission error factor comprises:
   transmitting the one or more data packets; and
   determining the transmission error factor based on a number of acknowledgement packets received in response to the transmitted one or more data packets.

3. The method of claim 1, wherein the transmission error factor is based on a number of errors occurring in the transmission of the one or more data packets.

4. The method of claim 1, wherein the transmission error factor is a value based on (i) a number of transmission errors occurring successively multiplied by a first weighting factor and (ii) a number of transmission errors occurring sporadically multiplied by a second weighting factor, the first weighting factor being greater than the second weighting factor.

5. The method of claim 1, wherein the pre-determined fragmentation threshold is a maximum data packet size for transmission over a backbone network of a wireless network formed by the access point and the one or more associated wireless units.

6. The method of claim 5, wherein the pre-determined fragmentation threshold is related to a maximum data packet size for transmission over a wireless medium operating as a wireless communication path between the access point and the one or more associated wireless units.

7. Adapted to communicate with one or more associated wireless units, an access point comprising:
   an address table; and
   a logic circuit in communication with the address table, the logic circuit to:
   determine a transmission error factor indicative of errors occurring in a transmission of a first group of data packets to the one or more associated wireless units, the transmission error factor being a weighted value with transmission errors occrurring successively having a different weighting than transmission errors experienced by the first group of data packets occurring sporadically; and
   automatically adjust the fragmentation threshold based on the transmission error factor after translating a desired finite time duration for the transmission into the fragmentation threshold based of a data transmission rate of a second group of data packets following the first group of data packets, the fragmentation threshold is based on a pre-determined fragmentation threshold divided by a divisional factor and is adjusted by the divisional factor each time the fragmentation threshold is adjusted.

8. The access point of claim 7, wherein the logic circuit in determining the transmission error factor is capable of:
   transmitting the first group of data packets to the one or more associated wireless units; and
   determining the transmission error factor based on a number of acknowledgement packets received in response to the transmitted the first group of data packets from the one or more associated wireless units.

9. The access point of claim 7, wherein the transmission error factor depends on a number of errors occurring in the transmission of the first group of data packets.

10. The access point of claim 7, wherein the transmission error factor is a value based on (i) a number of transmission errors occurring successively for the first grouped of data packets multiplied by a first weighting factor and (ii) a number of transmission errors occurring sporadically for the first group of data packets multiplied by a second weighting factor.

11. The access point of claim 7, wherein the transmission error factor is a weighted value with the transmission errors occurring successively having a greater weighting than transmission errors experienced by the first group of data packets occurring sporadically.

12. The access point of claim 7, wherein the logic circuit in automatically adjusting the fragmentation threshold is capable of:
   comparing the transmission error factor to an upper threshold; and
   decreasing the finite time duration by decreasing the fragmentation threshold if the transmission error factor is above the upper threshold.

13. The access point of claim 7, wherein the logic circuit in automatically adjusting the fragmentation threshold is capable of:
  comparing the transmission error factor to a lower threshold; and
  increasing the finite time duration by increasing the fragmentation threshold if the transmission error factor is below the lower threshold.

14. The access point of clam 7, wherein the pre-determined fragmentation threshold is a maximum data packet size for transmission over a backbone network of a wireless network formed by the access point and the one or more associated wireless units.

15. A method of automatically adjusting a fragmentation threshold for data transmissions between an access point and at least one wireless unit, comprising:
  determining a transmission error factor indicative of errors occurring in a transmission of one or more data packets between the access point and the at least one wireless unit, the transmission error factor being a weighted value with transmission errors occurring successively having a different weighting than transmission errors experienced by a first group of data packets occurring sporadically; and
  adjusting the fragmentation threshold based on the transmission error factor after translating a desired finite time duration for the transmission into the fragmentation threshold based of a transmission rate of at least one data packet following the one or more data packets, the fragmentation threshold is a pre-determined fragmentation threshold divided by a divisional factor and is adjusted by the divisional factor each time the fragmentation threshold is adjusted.

16. The method of claim 15, wherein the determining of the transmission error factor comprises:
  transmitting the one or more data packets; and
  determining the transmission error factor based on a number of acknowledgment packets received in response to the transmitted one or more data packets.

17. The method of claim 15, wherein the transmission error factor is based on a number of errors occurring in the transmission of the one or more data packets.

18. The method of claim 15, wherein the transmission error factor is a value based on (i) a number of transmission errors occurring successively multiplied by a first weighting factor and (ii) a number of transmission errors occurring sporadically multiplied by a second weighting factor, the first weighting factor being greater than the second weighting factor.

19. The method of claim 15, wherein the transmission error factor is a weighed value with transmission errors occurring successively to each other having a greater weighting than transmission errors occurring sporadically.

20. The method of aim 15, wherein automatically adjusting the fragmentation threshold comprises:
  comparing the transmission error factor to an upper threshold; and
  decreasing the finite time duration by decreasing the fragmentation threshold if the transmission error factor is above the upper threshold.

21. The method of claim 15, wherein automatically adjusting the fragmentation threshold comprises:
  comparing the transmission error factor to a lower threshold; and
  increasing the finite time duration by increasing the fragmentation threshold if the transmission error factor is below the lower threshold.

22. The method of claim 15, wherein the pre-determined fragmentation threshold is a maximum data packet size for transmission over a backbone network of a wireless network formed by the access point and the one or more wireless units.

23. An access point, adapted to communicate with at least one wireless unit via a wireless medium to provide the at least one wireless unit access to a wireless network, comprising:
  a wireless transceiver; and
  a logic circuit coupled to the wireless transceiver, the logic unit to (i) determine a transmission error factor indicative of errors occurring in a transmission of one or more data packets between the access point and the at least one wireless unit, the transmission error factor being a weighted value with transmission errors occurring successively having a different weighting than transmission errors experienced by a first group of data packets occurring sporadically, and (ii) adjust the fragmentation threshold based on the transmission error factor after translating a desired finite time duration for the transmission into the fragmentation threshold based of a transmission rate of at least one data packet following the one or more data packets, the fragmentation threshold, being based on a pre-determined fragmentation threshold divided by a divisional factor, is adjusted by changing the divisional factor each item the fragmentation threshold is adjusted.

24. The access point of claim 23, wherein the logic circuit to determine the transmission error factor by computing a weighted value with transmission errors occurring successively having a greater weighting than transmission errors experienced by the one or more packets occurring sporadically.

* * * * *